United States Patent
Hennig et al.

(10) Patent No.: US 7,985,047 B2
(45) Date of Patent: Jul. 26, 2011

(54) EXPANDABLE LINE SUPPORT FOR WIND TURBINE

(75) Inventors: Jens Hennig, Rheine (DE); Patrick Achenbach, Rheine (DE)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 12/178,750

(22) Filed: Jul. 24, 2008

(65) Prior Publication Data

US 2010/0021309 A1    Jan. 28, 2010

(51) Int. Cl.
*F03D 11/00* (2006.01)

(52) U.S. Cl. ..... 416/61; 415/118; 415/216.1; 416/146 R

(58) Field of Classification Search ............... 416/216.1, 416/118, 155, 159, 146 R, 61; 415/216.1, 415/118
See application file for complete search history.

(56) References Cited

U.S. PATENT DOCUMENTS

| | | | |
|---|---|---|---|
| 6,713,891 B2 * | 3/2004 | Kirkegaard et al. | 290/44 |
| 7,126,236 B2 | 10/2006 | Harbourt et al. | |
| 2009/0179428 A1 * | 7/2009 | Achenbach | 290/55 |
| 2009/0206610 A1 * | 8/2009 | Martin et al. | 290/55 |

FOREIGN PATENT DOCUMENTS

JP    06105440 A  *  4/1994

* cited by examiner

*Primary Examiner* — Justine Yu
*Assistant Examiner* — Jesse Prager
(74) *Attorney, Agent, or Firm* — William F. Heinze; Ernest G. Cusick; Frank A. Landgraff

(57) ABSTRACT

A wind turbine includes a tower; a blade for rotating on the tower; a rotor shaft, connected to the blade, having an axial hole; a line, arranged in the hole, for carrying a signal; a support, wrapped around the line inside the hole, for spacing the line from the rotor shaft inside the hole; where the support expands radially to at least partially fill an annular space between the line and an inside wall of the axial hole.

18 Claims, 3 Drawing Sheets

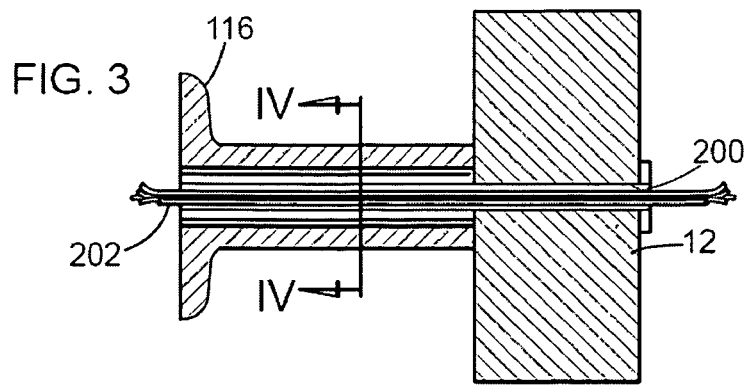
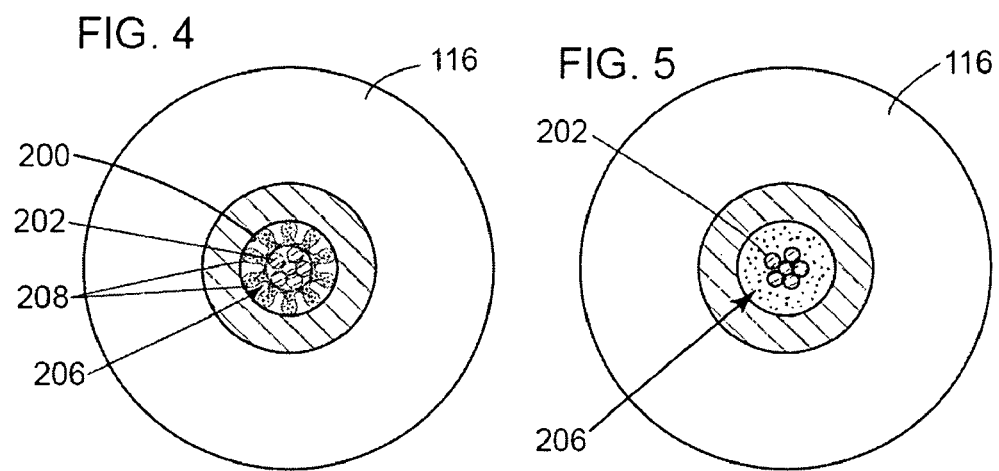
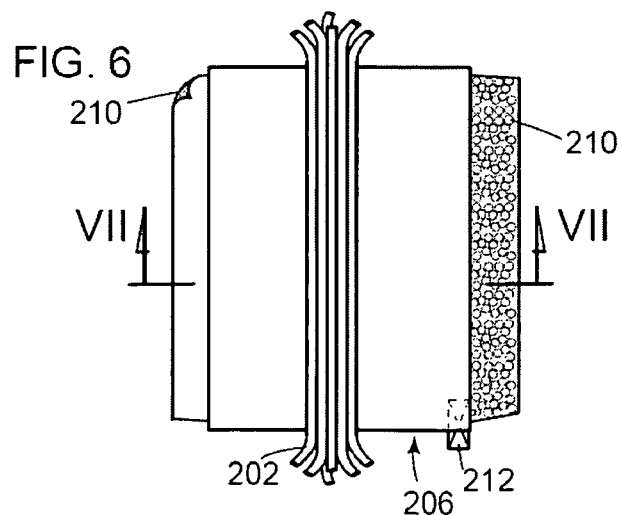
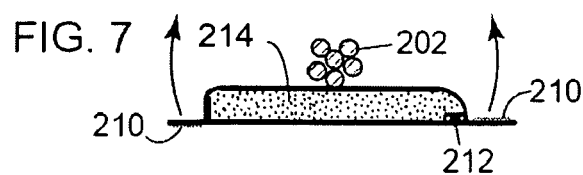

_US 7,985,047 B2_

EXPANDABLE LINE SUPPORT FOR WIND TURBINE

BACKGROUND OF THE INVENTION

1. Technical Field

The subject matter described here generally relates to wind turbines, structures, and, more particularly, to expandable cable supports for wind turbines.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1. This particular configuration for a wind turbine 2 includes a tower 4 supporting a nacelle 6 enclosing a drive train 8. The blades 10 are arranged on a hub to form a 'rotor' at one end of the drive train 8 outside of the nacelle 6. The rotating blades 10 drive a gearbox 12 connected to an electrical generator 14 at the other end of the drive train 8 arranged inside the nacelle 6 along with a control system 16 that may receive input from an anemometer 18.

The blades 10 generate lift and capture momentum from moving air that is them imparted to a rotor as the blades spin in the "rotor plane." Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord fine is simply the "chord."

"Angle of attack" is a term that is used in to describe the angle between the chord line of the blade 10 and the vector representing the relative motion between the blade and the air. "Pitching" refers to rotating the angle of attack of the entire blade 10 into or out of the wind in order to control the rotational speed and/or absorption of power from the wind. For example, pitching the blade "towards feather" rotates of the leading edge of the blade 10 into the wind, while pitching the blades "towards stall" rotates the leading edge of the blade out of the wind.

For so-called "pitch controlled" wind turbines, the pitch may be adjusted each time the wind changes in order to maintain the rotor blades at the optimum angle and maximize power output for all wind speeds. For example, the control system 16 may check the power output of the turbine 2 several times per second. When the power output becomes too high, the control system 16 then sends a signal to the blade pitch mechanism (not shown in FIG. 1) which causes the blades 10 to be pitched slightly out of the wind. The blades 10 are then turned back into the wind when the wind speed slows down.

Commonly-assigned U.S. Pat. No. 7,126,236 entitled "Methods and Apparatus for Pitch Control Power Conversion" is incorporated by reference here and partially reproduced in FIG. 2. The control system 16 (from FIG. 1) includes one or more controllers within control panel 112 for overall system monitoring and control including pitch and speed regulation, high-speed shaft and yaw brake application, yaw and pump motor application and fault monitoring.

The control system 16 provides control signals to the variable blade pitch drive or actuator 114 to control the pitch of blades 10 (FIG. 1) that drive hub 110. The drive train 8 (FIG. 1) of the wind turbine 2 includes a main rotor shaft 116 (also referred to as a "low speed shaft") connected to hub 110 and a gear box 12. A high speed shaft from the opposite end of the gear box is used to drive a first generator 120. In some configurations, torque is transmitted via a coupling 122.

The blade pitch control signals are typically provided in the form of electrical impulses signals from the control system 16 that are carried along cables extending through a hole at the center of the shaft 116 from a slip ring attached to the back of the gearbox 12. However, the rotating shaft 116 can damage the external protective coating of the cables which can short circuit or otherwise interfere with the transmission of those control signals.

BRIEF DESCRIPTION OF THE INVENTION

These and other drawbacks associated with such conventional approaches are addressed here in by providing, in various embodiments, a wind turbine, including a tower; a blade for rotating on the tower; a rotor shaft, connected to the blade, having an axial hole; a line, arranged in the hole, for carrying a signal; and a support for spacing the line from the rotor shaft inside the hole.

BRIEF DESCRIPTION OF THE DRAWINGS

Various aspects of this technology will now be described with reference to the following figures ("FIGs.") which are not necessarily drawn to scale, but use the same reference numerals to designate corresponding pails throughout each of the several views.

FIG. 3 is a schematic, partial cross-section of the rotor shaft and gearbox shown in FIG. 2;

FIG. 4 is a cross-sectional view taken along section line IV-IV in FIG. 3.

FIG. 5 is an alternative cross-sectional view taken along section line IV-IV in FIG. 3.

FIG. 6 is a plan view of the mat shown in FIG. 5 in an unrolled configuration;

FIG. 7 is cross-sectional view taken along section line VII-VII in FIG. 6.

DETAILED DESCRIPTION OF THE INVENTION

Figure 1:
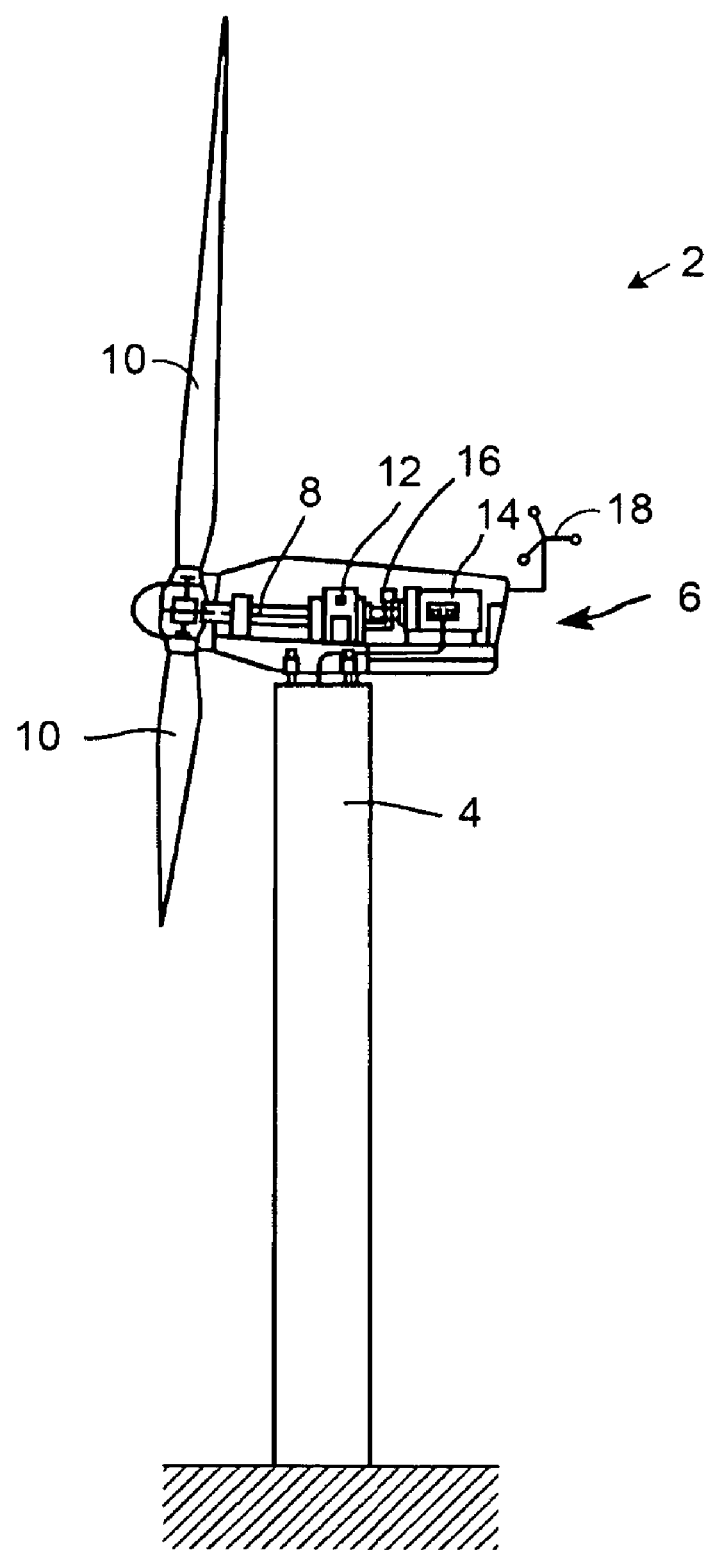
FIG. 1 is a schematic side view of a conventional wind generator.
Figure 2:
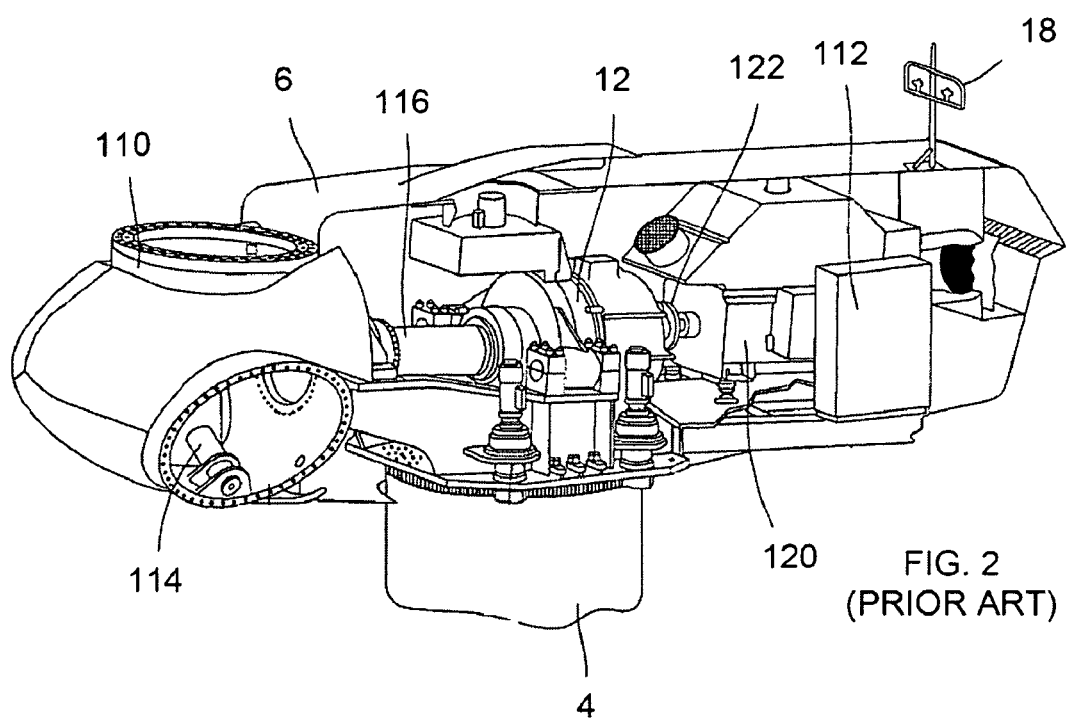
FIG. 2 is a cut-away orthographic view of the nacelle and hub of the conventional wind generator shown in FIG. 1.

FIG. 3 is a schematic, partial cross-section of the gearbox 12 and rotor shaft 116 from FIG. 2. The rotor shaft 116 includes an axial hole 200 containing one or more lines 202 for carrying signals between, for example, the slip ring 204 to the blade pitch actuator 114 shown in FIG. 2. The term "lines" is used here broadly to include electrical leads, conductors, wires, cables, cords, pneumatic and hydraulic carriers, waveguides, and fibers such as optical fibers. The term "signals" is not limited to communication signals and may also include power and/or power signals. For example, the lines may carry electrical power.

FIG. 4 is a cross-sectional view of the rotor shaft 116 taken along section line IV-IV in FIG. 3 including one example of a line support 206 for spacing one or more of the fines 202 from the rotor shaft 206 inside the hole 200. However, the line support may also be used in other holes, such as ductwork, and/or to support other members such as pipes. A portion of the line support 206 may also extend beyond the end of the axial hole 200.

In FIG. 4, the illustrated line support 206 is provided with one or more optional fingers 208 for positioning the support 206 in the hole 200. In this example, seven fingers 208 extend radially from the lines 202 arranged on the axis of the shaft and the fingers extend along a length of the mat substantially parallel to the lines 202. However, any other number of fingers 208 and/or orientation may be provided. For example, the fingers may be arranged substantially perpendicular to the lines 202, in a spiral configuration around the lines, and/or may extend only partially or intermittently across the width ad/or length of the line support 202. Each of the fingers 208 may also be filled with a resilient and/or compressible material, such as foam rubber, for providing additional structural rigidity to the fingers. As illustrated in FIG. 5, the line support 206 may be alternatively provided without fingers 208 so that the line support 206 has a substantially uniform thickness.

FIG. 6 illustrates a plan view of the line support 206 shown in FIG. 5 in an unrolled configuration, while FIG. 7 illustrates a cross-section taken along section line VII-VII. FIG. 6 illustrates one way in which the line support 206 may be configured as a mat. The lines 202 are placed on one side of the line support 206 which is then wrapped around the lines 202 so as to enclose or partially-enclose the lines 202. A fastener 210 may be provided on the line support 206 for securing the line support around the lines 202. For example, the fastener may include a hook and loop fastener, batten, bolt, screw, cap screw, stud, buckle, button, clamp, clasp, clip, grommet, peg, pin, ring, band, snap, strap, staple, tack, tie, toggle, wedge anchor, and/or zipper. The fastener 210 may be arranged on one or more sides of the mat, such as for better fixation.

The line support 206 may also be expandable in order to fill or partially fill the hole 200 in the rotor shaft 116. For example, the line support 206 may be provided with a valve 212, stopper, or other closure for allowing fluid to be added or removed from the inside of the support. In this configuration, after rolling, compressing, and fastening the line support 206 mat around the lines, the line support may be further compressed such as by extracting air using a vacuum pump attached to the valve 212. The further compressed line support 206 and lines 202 may then be easily inserted into the hole 200. Once inside the hole 200, the line support 206 may then be pressurized in order to fill or partially-fill the hole 200. Alternatively, or in addition, the line support 206 may be filled with a resilient material 214 (FIG. 7), such as foam rubber, so that the valve 212 may simply be reopened in order to allow that resilient material in fingers to expand. In this configuration, line support 206 is self-inflating. Although FIG. 7 illustrates the line support 206 in an expanded configuration prior to being wrapped around the fines 202, the fine support may also be maintained in a compressed or partially compressed configuration with the valve 212 closed in order to facilitate wrapping of the compressed line support around the lines before the line support and lines are inserted into the hole 200 and the line support is expanded by opening the valve.

The line support 206 offers various advantages over conventional approaches. For example, the device avoids the need for spacing and/or securing cables and other fines 202 in ductwork with messy and noxious polyurethane foam that can otherwise require significant time to cure and then still be easily damaged by vibration and/or other movement once it has set. When expanded, the cable support 206 also provides a level of vibration damping that stiffer supports, such as conventional cable conduits, do not provide. The cable support 206 also allows lines 202 to be easily inserted into tight spaces and then helps to protect the entire length of those lines once they are inside the hole 200 or other spaces. For example, the support 206 helps to minimize dynamic stress on cables or other lines inside the hole 200. The lines 202 can also be pre-packaged in the line support 206 in order to simplify field installation. Installation and maintenance of the lines 202 and surrounding equipment is also facilitated by the capacity of the support 206 to be easily removed from the hole 200 when depressurized and then just as easily reinserted when re-pressurized.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine, comprising:
   a tower;
   a blade for rotating on the tower;
   a rotor shaft, connected to the blade, having an axial hole;
   a line, arranged in the hole, for carrying a signal;
   a support, wrapped around the line inside the hole, for spacing the line from the rotor shaft inside the hole;
   wherein the support expands radially to at least partially fill an annular space between the line and an inside wall of the axial hole; and wherein the support comprises a plurality of fingers for positioning the support in the rotor shaft.

2. The wind turbine recited in claim 1, wherein the support expands to substantially fills the annular space between the line and an inside wall of the axial hole.

3. The wind turbine recited in claim 1, wherein the fingers extend radially relative to the line.

4. The wind turbine recited in claim 1, wherein the fingers also extend along a length of the support substantially parallel to the line.

5. The wind turbine recited in claim 1, wherein the support comprises a fastener for securing the support around the line.

6. The wind turbine recited in claim 5, wherein the fastener comprises a hook and loop fastener.

7. The wind turbine recited in claim 1, wherein the support comprises an opening for transporting a fluid into the support.

8. The wind turbine recited in claim 4, wherein the support further comprises a hook and loop fastener for securing the support around the line.

9. The wind turbine recited in claim 3, wherein the support further comprises an opening for transporting a fluid into the support.

10. The wind turbine recited in claim 6, wherein the support further comprises an opening for transporting a fluid into the support.

11. The wind turbine recited in claim 3, wherein the support further comprises an opening for transporting a fluid into the support.

12. The wind turbine recited in claim 11, wherein the support further comprises a hook and loop fastener for securing the support around the line.

13. The wind turbine recited in claim 2, wherein the support further comprises an opening for transporting a fluid into the support.

14. The wind turbine recited in claim 1, wherein the support further comprises an opening for transporting a fluid into the support.

15. The wind turbine recited in claim 4, wherein the support further comprises an opening for transporting a fluid into the support.

16. The wind turbine recited in claim 7, wherein the support is self-inflating.

17. The wind turbine recited in claim 9, wherein the support is self-inflating.

18. The wind turbine recited in claim 14, wherein the support is self-inflating.

* * * * *